United States Patent
Xu et al.

(10) Patent No.: US 8,803,078 B2
(45) Date of Patent: Aug. 12, 2014

(54) METHOD AND APPARATUS FOR NEUTRON LOGGING USING A POSITION SENSITIVE NEUTRON DETECTOR

(75) Inventors: Libai Xu, Katy, TX (US); Kevin S McKinny, Cypress, TX (US); Cornelis Huiszoon, Houston, TX (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 296 days.

(21) Appl. No.: 13/100,683

(22) Filed: May 4, 2011

(65) Prior Publication Data
US 2011/0272570 A1 Nov. 10, 2011

Related U.S. Application Data

(60) Provisional application No. 61/331,116, filed on May 4, 2010.

(51) Int. Cl.
*G01V 5/10* (2006.01)

(52) U.S. Cl.
USPC .................................. 250/269.4; 250/370.01

(58) Field of Classification Search
USPC ......................................... 250/269.4, 370.01
See application file for complete search history.

(56) References Cited

U.S. PATENT DOCUMENTS

| | | | |
|---|---|---|---|
| 3,483,376 A | 12/1969 | Locke | |
| 4,423,323 A | 12/1983 | Ellis | |
| 4,570,067 A * | 2/1986 | Gadeken | 250/266 |
| 4,618,765 A | 10/1986 | Sonne | |
| 4,638,158 A | 1/1987 | Sonne | |
| 4,870,280 A * | 9/1989 | Yamashita et al. | 250/368 |
| 5,298,756 A * | 3/1994 | McCollum et al. | 250/390.07 |
| 5,767,510 A | 6/1998 | Evans | |
| 6,584,837 B2 * | 7/2003 | Kurkoski | 73/152.02 |
| 6,781,115 B2 | 8/2004 | Stoller | |
| 6,894,274 B2 | 5/2005 | Valant-Spaight | |
| 6,989,541 B2 * | 1/2006 | Penn | 250/390.01 |
| 7,002,159 B2 * | 2/2006 | Lacy | 250/390.01 |
| 7,365,307 B2 | 4/2008 | Stoller | |
| 2004/0178337 A1 | 9/2004 | Kurkoski et al. | |
| 2008/0283762 A1 * | 11/2008 | Weissman et al. | 250/374 |
| 2012/0153180 A1 * | 6/2012 | Lacy | 250/390.12 |

OTHER PUBLICATIONS

GE Energy; "Reuter stokes helium-3 filled position sensitive proportional counter—RS-P4-0424-201" 2005 General Electric Company.
Gilchrist, W.A., Jr.; "Compensated neutron log response issues—A tutorial" SPWLA 49th Annual Logging Symposium, Edinburgh, Scotland, May 25-28, 2008.
Ellis, Darwin V., et al; "Porosity from neutron logs I: Measurement" Petrophysics, vol. 44, No. 6, Nov.-Dec. 2003; p. 383-395.

(Continued)

*Primary Examiner* — Christine Sung
(74) *Attorney, Agent, or Firm* — Jeremy Berman

(57) ABSTRACT

A neutron logging tool includes a neutron source and at least one position sensitive thermal or epithermal neutron detector. The logging tool further includes an electronic controller configured to estimate the axial location of detected neutrons. Measurement of the axial neutron flux distribution enables other formation and borehole parameters such as formation porosity and sensor standoff to be computed. In logging while drilling embodiments, a borehole caliper may also be computed form the axial neutron flux distribution.

25 Claims, 6 Drawing Sheets

(56) References Cited

OTHER PUBLICATIONS

Ellis, Darwin V., et al; "Porosity from neutron logs II: Interpretation" Petrophysics, vol. 45, No. 1, Jan.-Feb. 2004; p. 73-86.

Athanasiades, Athanasios, et al.; "Straw detector for high rate, high resolution neutron imaging" 2005 IEEE Nuclear Science Symposium Conference Record, pp. 623-627.

* cited by examiner

METHOD AND APPARATUS FOR NEUTRON
LOGGING USING A POSITION SENSITIVE
NEUTRON DETECTOR

RELATED APPLICATIONS

This application claims the benefit of: (i) U.S. Provisional Application Ser. No. 61/331,116 entitled Method and Apparatus for Neutron Logging using a Position Sensitive Neutron Detector, filed May 4, 2010.

FIELD OF THE INVENTION

The present invention relates generally to neutron logging of a subterranean borehole. In particular, this invention relates to an apparatus and method for making high spatial resolution neutron logging measurements of a subterranean formation using a position sensitive neutron detector.

BACKGROUND OF THE INVENTION

Neutron logging is a common measurement used in both wireline logging and logging while drilling operations as an indication of formation porosity. In neutron logging operations, a neutron source emits high energy ("fast") neutrons into the formation. Americium-241/Beryllium (AmBe) and Californium-252 are common chemical neutron sources. A flux of fast neutrons can alternatively be generated by an electrical source such as a d-T or d-D generator. The fast neutrons are slowed by the surrounding formation (particularly via collisions with hydrogen nuclei present in the formation and the borehole and eventually captured). The capture of a neutron may result in the emission of one or more prompt gamma rays. While, neutron logging tools can be configured to detect the capture gamma rays, epithermal and/or thermal neutrons are most commonly detected using one or more thermal or epithermal neutron detectors. In most applications these detectors are $^3$He proportional counters.

FIG. 1 depicts a common configuration of a prior art neutron logging tool 10. In the configuration depicted, a sealed chemical source 12 is deployed in a tool body in close proximity with (e.g., within a few feet) and longitudinally spaced from first and second longitudinally spaced neutron detectors 14 and 16 (commonly referred to in the art as near and far detectors).

During a subterranean logging operation the ratio of the neutron count rates at the near and far detectors (the near to far ratio) is commonly taken to be indicative of liquid-filled formation porosity and/or the hydrogen concentration (hydrogen index) of the formation. In formations having a high concentration of hydrogen, the emitted neutrons are slowed down more efficiently and captured in closer proximity to the source. As a result, a relatively small number of neutrons are detected at the far detector, resulting in a relatively high near to far detection ratio. This high ratio is commonly interpreted as being indicative of high porosity (since the hydrocarbons and/or water tend to occupy pore space in the formation). In formations having a low concentration of hydrogen, the emitted neutrons tend to travel farther. This results in a higher count rate at both detectors and a lower near to far detection ratio. A low ratio is thus commonly interpreted as being indicative of low porosity.

Those of ordinary skill in the art will readily appreciate that the above described mechanism is highly simplified and that in practice the interpretation of neutron logs can be complicated by numerous factors. Despite the fact that neutron logging techniques have been in commercial use for over 50 years, the interpretation of neutron logs remains challenging (and is considered by some to be an art). For example, Ellis et al states that there are numerous "mysterious effects that must be dealt with when using neutron porosity logs" (emphasis added) (*Ellis, Case, and Chiaramonte, Petrophysics*, 2003, 44(6), p. 383). There is clearly a need in the art for improved tools and methods for making and interpreting neutron logging measurements.

SUMMARY OF THE INVENTION

Exemplary aspects of the present invention are intended to address the above described need for improved neutron logging tools and methods. In one exemplary embodiment of the invention, a neutron logging tool includes a neutron source and at least one position sensitive thermal or epithermal neutron detector. The position sensitive neutron detector may include, for example, a position sensitive He-3 detector or a position sensitive boron lined proportional counter (often referred to as a straw detector). In other embodiments, the neutron sensor may include a bundle of straw detectors including either a one-dimensional or a two-dimensional array of thin walled boron coated straw tubes. In still another embodiment, the neutron sensor may include a scintillation crystal having first and second photomultipliers deployed at corresponding first and second ends thereof. The logging tool further includes an electronic controller configured to estimate the axial location of each detected neutron.

Exemplary embodiments of the present invention advantageously enable spatially resolved neutron count data to be acquired. These spatially resolved data provide considerable additional information as compared to prior art neutron count data. The additional information may be used to improve the evaluation of various properties of the subterranean formation and the borehole. For example, the formation porosity and sensor standoff may be computed independent of other measurements. Borehole caliper may also be computed in logging while drilling (LWD) embodiments. Moreover, high resolution bed boundary or thin bed detection may be possible using neutron detector(s) with high spatial resolution. The high spatial resolution may be particularly advantageous in LWD imaging applications. The present invention may also enable a reduction of statistical noise to be achieved.

In one aspect the present invention includes a neutron logging tool having a logging tool body. A neutron source and at least one position sensitive neutron detector are deployed on the tool body. The logging tool further includes a controller configured to determine an axial location of a detected neutron along the neutron detector.

In another aspect the present invention includes a method for making a neutron logging measurement in a subterranean borehole. The method includes deploying an axially sensitive neutron logging tool in a borehole and measuring an axial neutron flux distribution. Exemplary embodiments of the invention may further include distributing the axial neutron flux distribution into a plurality of predetermined axial bins with each of the bins including neutron counts at a range of corresponding axial positions. Other embodiments may further include fitting the axial neutron flux distribution to mathematical function.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 2:
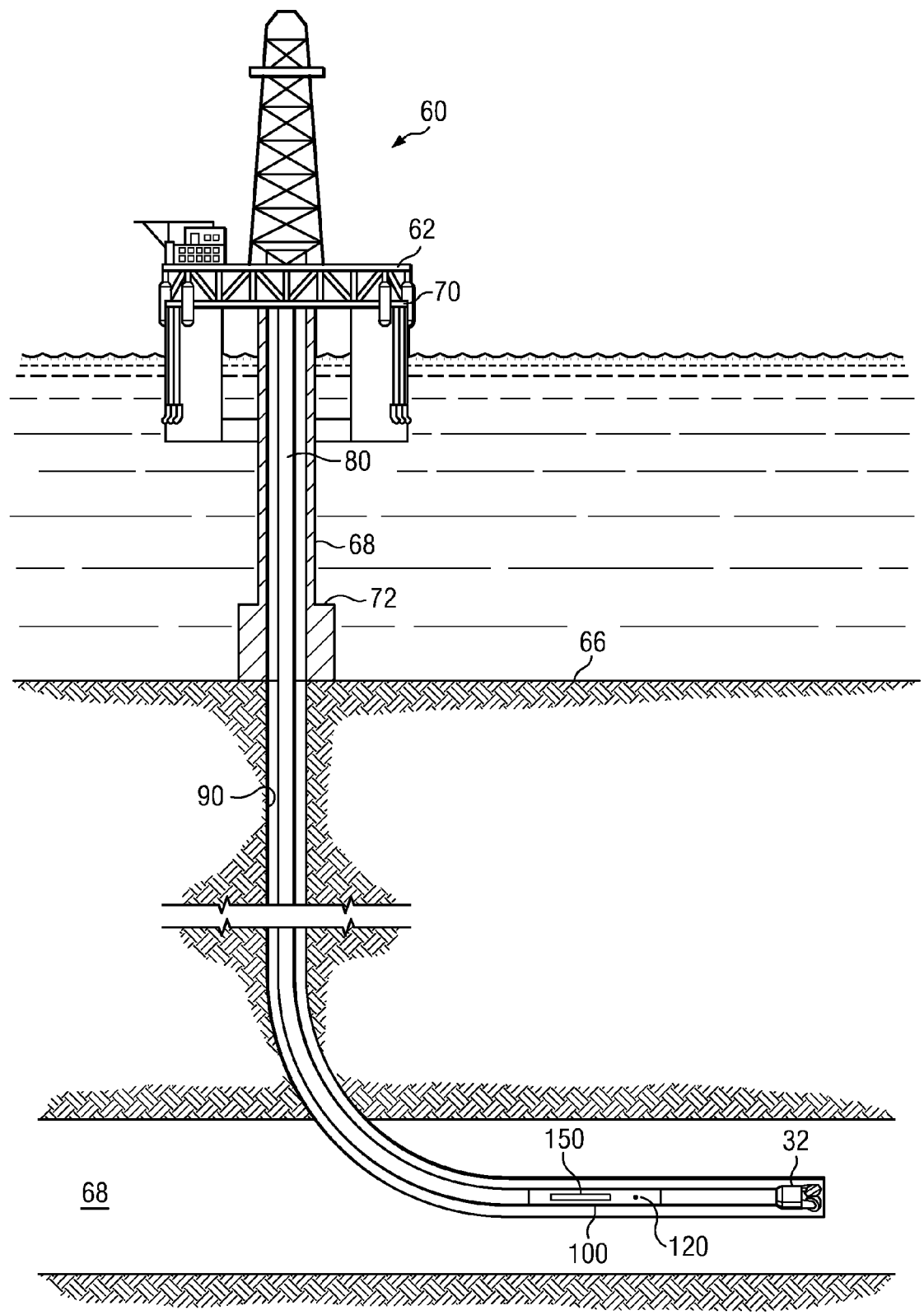
FIG. 2 depicts a conventional drilling rig on which exemplary embodiments of the present invention may be utilized.
Figure 5:
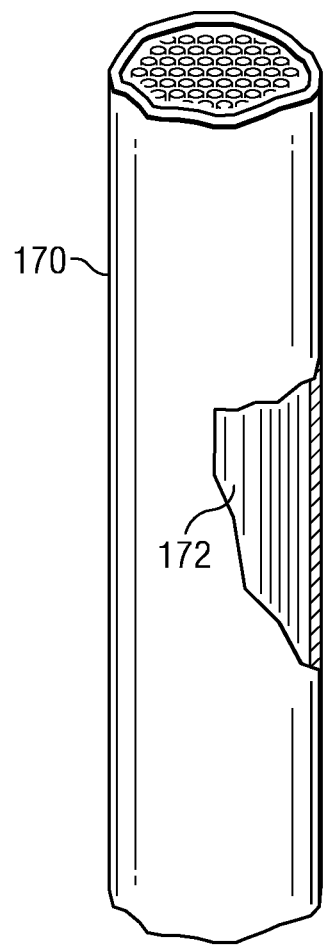
FIG. 5 depicts an alternative embodiment of a position sensitive neutron detector suitable for use in the neutron logging tool depicted on FIG. 3.

FIG. 2 depicts one exemplary embodiment of a neutron logging tool 100 in use in an offshore oil or gas drilling assembly, generally denoted 60. In FIG. 2, a semisubmersible drilling platform 62 is positioned over an oil or gas formation 68 disposed below the sea floor 66. A subsea conduit 68 extends from deck 70 of platform 62 to a wellhead installation 72. The platform may include a derrick and a hoisting apparatus for raising and lowering the drill string 80, which, as shown, extends into borehole 90 and includes a drill bit 82 and logging tool 100. Embodiments of neutron logging tool 100 include at least one neutron source 120 and at least one position sensitive neutron detector 150 as described in more detail below with respect to FIGS. 3-6. Drill string 80 may further include, for example, a downhole drill motor, a mud pulse telemetry system, a steering tool, and/or one or more of numerous other MWD and LWD sensors for sensing downhole characteristics of the borehole and the surrounding formation. The invention is not limited in these regards.

It will be understood by those of ordinary skill in the art that the deployment depicted on FIG. 2 is merely exemplary for purposes of describing the invention set forth herein. It will be further understood that logging tools in accordance with the present invention are not limited to use with a semisubmersible platform 62 as illustrated on FIG. 2. Logging tool 100 is equally well suited for use with any kind of subterranean drilling operation, either offshore or onshore. Moreover, while neutron logging tool 100 is shown coupled with drill string 80 on FIG. 2, it will be understood that the invention is not limited to logging while drilling embodiments. Neutron logging tool 100 may include, for example, a neutron logging tool configured for use in wireline logging operations and may be conveyed into the borehole using substantially any means of conveyance, for example, including wireline, slick line, coiled tubing, drilling pipe, and the like. The invention is not limited in any of these regards.

Figure 1:
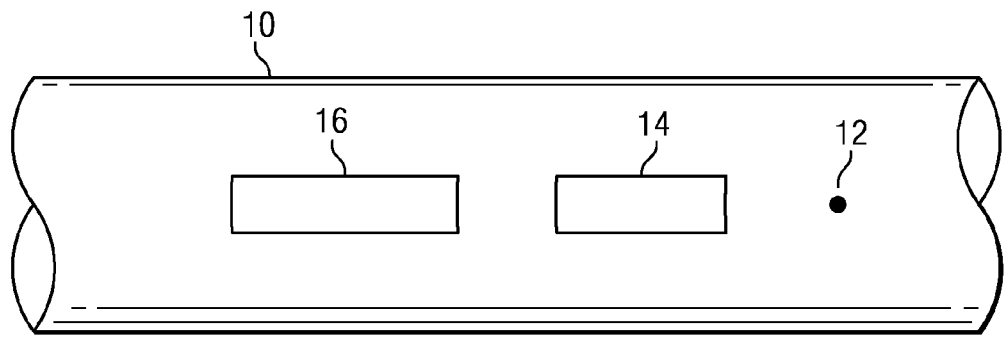
FIG. 1 depicts a prior art neutron logging tool.
Figure 3:
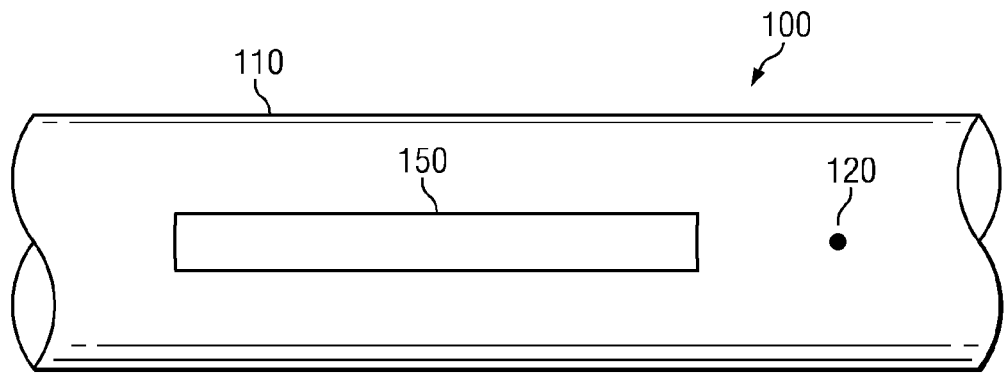
FIG. 3 depicts one exemplary embodiment of a neutron logging tool in accordance with the present invention.

FIG. 3 depicts one exemplary embodiment of a neutron logging tool 100 in accordance with the present invention. As described above with respect to FIG. 2, logging tool 100 includes a neutron source 120, e.g., including a suitable chemical or electrical source, and a position sensitive neutron detector 150 deployed in a tool body 110. A suitable chemical neutron source may include an alpha-emitter mixed with beryllium such as the americium-241/beryllium chemical source. The neutron source 120 may alternatively include the californium-252 chemical source. Suitable electrical neutron sources may be substantially continuous or pulsed and commonly make use of the deuterium-tritium (D-T) nuclear reaction, the deuterium-deuterium (D-D) nuclear reaction, and/or the tritium-tritium (T-T) nuclear reaction.

While not depicted on FIG. 3, it will be understood that neutron logging tool 100 may further optionally include, for example, a stand-off or caliper sensor for determining the standoff between the neutron detector 150 and the borehole wall and/or the borehole cross sectional shape. Such standoff and/or caliper sensors are known in the art and commonly include one or more ultrasonic sensors. Standoff measurements may also be derived directly from the neutron measurement. The use of a position sensitive detector may be particularly advantageous for such an implementation in that it provides sufficient additional information for an accurate determination of the sensor standoff as described in more detail below. Logging tool 100 may further optionally include an azimuth sensor (not shown) configured to measure the azimuth angle (toolface angle) of the neutron sensor 150 in substantially real time during drilling. Suitable azimuth sensors typically include one or more accelerometers and/or magnetometers and are well known in the art. Those of ordinary skill in the art will appreciate that azimuth sensors are commonly utilized in imaging while drilling applications. It will be understood that the invention is not limited to any particular azimuth, standoff, or caliper sensor configuration or even to the use of these additional sensors.

In the exemplary embodiment depicted, logging tool 100 includes a single position sensitive neutron detector 150, a long axis of which is substantially parallel with the longitudinal axis 105 of the tool 100. Sensor 150 is position sensitive in the sense that it is advantageously configured to provide axially resolved spatial resolution of the detected neutrons. In one exemplary embodiment of the invention a suitable position sensitive neutron detector may make use of the charge division method. For example, sensor 150 may include a He-3 position sensitive detector tube such as the Reuter Stokes Helium-3 Position Sensitive Proportional Counter available from General Electric Company. An alternative charge division sensor may include one or more boron-coated proportion counter tubes in which the neutron interaction takes place in the tube wall. In these position sensitive sensor embodiments, the detector makes use of a highly resistive anode material (e.g., a nickel chrome alloy) that enables the axial location of the neutron ionization event in the sensor to be determined.

While the invention is not limited in this regard, neutron detector 150 preferably has an axial length in the range from about 12 to about 36 inches (1 to 3 feet) and a spatial (axial) resolution in the range from about 0.1 to about 1 inch. Moreover the near end of the detector 150 is preferably axially spaced from the neutron source by a distance in the range from about 6 to about 18 inches (one half to one and one half feet). The invention is, of course, not limited in these regards.

Figure 4:
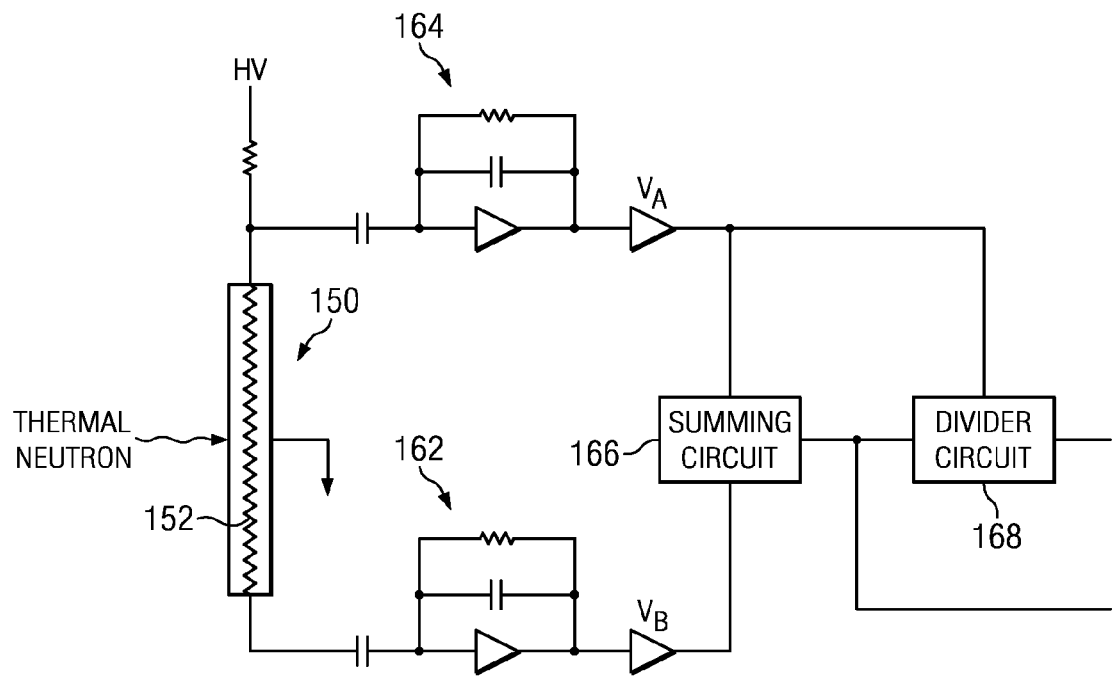
FIG. 4 depicts one exemplary embodiment of a control circuit configured for use with the neutron logging tool depicted on FIG. 3.

FIG. 4 depicts one exemplary embodiment of an electronic control circuit 160 for use with a neutron detector that makes use of the charge division method. As described above, the detector 150 includes a resistive anode (depicted schematically at 152). A thermal neutron ionization event (i.e., the detection of a thermal neutron) causes an electrical pulse at both ends of the detector 150. These pulses may be amplified via corresponding amplifier circuits 162 and 164. The amplified pulses are summed and the sum is compared to one (or both) of the individual signals (e.g. by taking the ratio of signal one and the sum) using circuits 166 and 168. The relative position of the ionization can be computed, for example, from a ratio of the pulse amplitudes (voltages).

With reference to FIG. 5, and reference again to FIG. 3, a suitable position sensitive neutron detector may alternatively include a bundle 170 of straw detectors. Those of ordinary skill in the art will readily appreciate that depicted embodiment is configured for a wireline tool embodiment (in that there is no mud channel). It will be understood that the tubes may also be deployed about a conventional mud channel in an LWD embodiment. The "area" detector depicted on FIG. 5 includes, for example, a two-dimensional array of close-packed boron lined straws 172. Each of the straws 172 may include a gas filled, boron lined tube whose axis is oriented in an axial direction (pointed along the longitudinal axis of the tool body). The use of straw detectors may advantageously provide full spatial resolution (both axial and circumferential) of the neutron ionizing event and may therefore be particularly suitable for neutron imaging measurements. Electronic circuitry (not depicted) enables the particular straw in which the neutron ionization event occurs to be determined, which in turn provides the aforementioned spatial (azimuthal) resolution. A bundle of straw detectors may be further configured such that straws in the middle of the bundle will detect mostly epithermal neutrons, thereby enabling a separate measurement of epithermal and thermal neutrons at the same axial location (see also U.S. Pat. No. 6,781,115).

Figure 6:
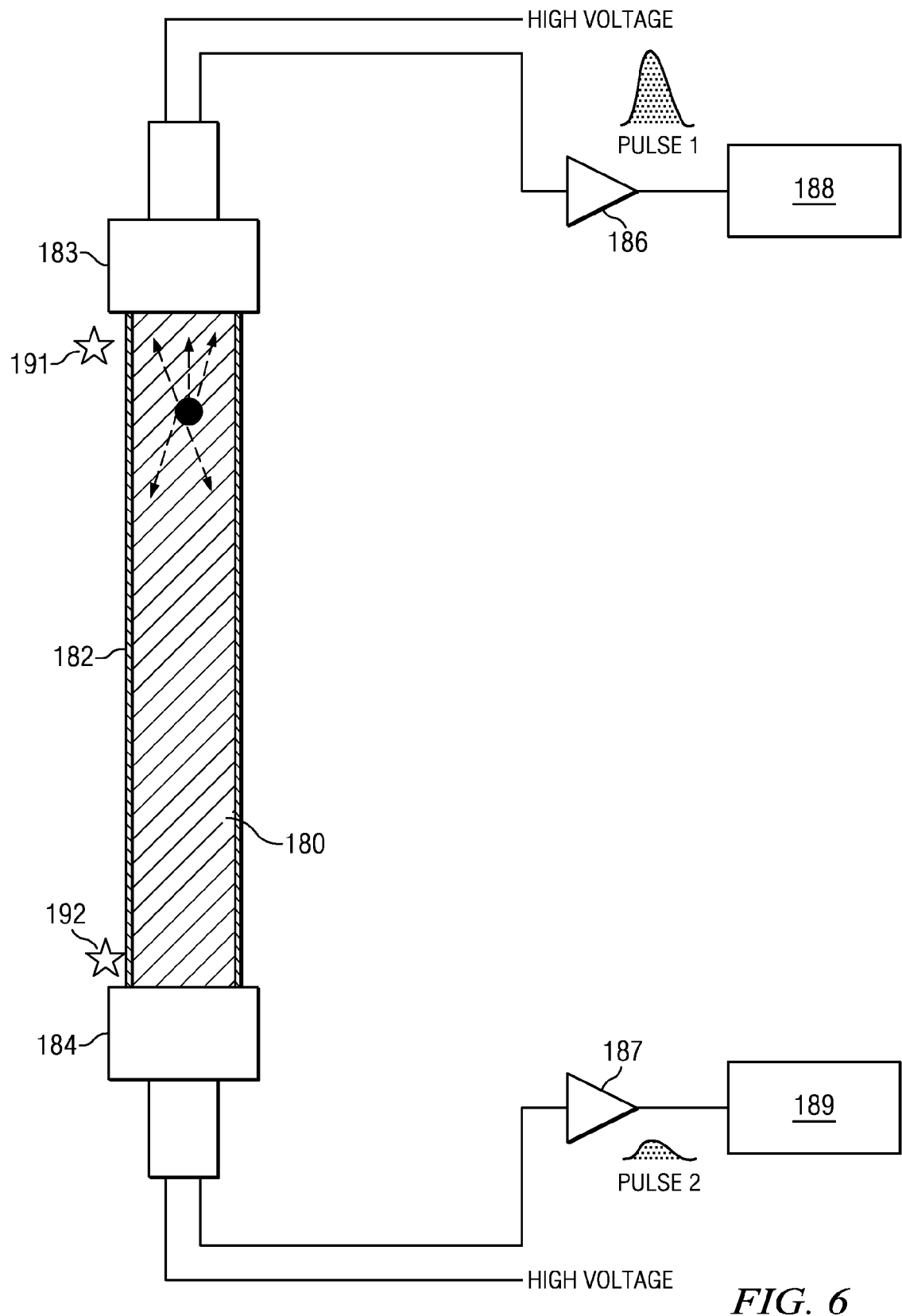
FIG. 6 depicts another alternative embodiment of a position sensitive neutron detector suitable for use in the neutron logging tool depicted on FIG. 3.

FIG. 6 depicts an alternative position sensitive neutron detector suitable for use in certain embodiments of the invention. In the exemplary sensor embodiment depicted, a position sensitive scintillation detector 180 (e.g., a scintillation crystal) may be surrounded by an optical reflector 182 to redirect light that has escaped from the detector back into the crystal. The scintillation detector 180 may include substantially any suitable neutron sensitive scintillator, for example, including $^6$Li-glass, $LiI_2$:Eu, Elpasolites, and others. First and second photomultipliers 183 and 184 are deployed at opposing axial ends of the scintillation detector 180. Each photomultiplier 183 and 184 may be connected to a corresponding preamplifier 186 and 187 and pulse height analyzer 188 and 189 to determine the corresponding pulse heights of the produced signals. While the invention is not limited in this regard, scintillation detector 180 is preferably elongated (e.g. substantially cylindrical) as depicted. In such elongated embodiments an off-center scintillation event tends to result in more light being transported to the close photomultiplier than the far photomultiplier. This effect is generally enhanced in scintillation detectors showing self-absorption (with the absorption acting similarly to the resistive wire in the charge division method described above). Further enhancements of the axial position sensitivity may be achieved by optimizing the reflector material 182 and a surface finish of the scintillation detector 180.

The axial position of a scintillation event may be inferred from the relative quantity of light received at the first and second photomultiplier's 183 and 184, for example, as given in the following mathematical equation:

$$z = f(A_1, A_2) \qquad \text{Equation 1}$$

Where z represents the axial position of the scintillation event, $f(A_1, A_2)$ represents a mathematical function of $A_1$ and $A_2$, and $A_1$ and $A_2$ represent the respective amplitudes of the light signals received at the first and second photomultipliers. Those of ordinary skill in the art will readily appreciate that the mathematical function $f(A_1, A_2)$ may include substantially any suitable function, for example, including a standard ratio.

Those of ordinary skill in the art will further appreciate that the gain of the photomultipliers typically requires regulation. Such gain regulation may be achieved, for example, by adjusting a photomultiplier high-voltage. Regulation may also be achieved, for example, by using one or more reference sources (e.g., a 662 keV $^{137}$Cs reference source). The exemplary embodiment depicted includes first and second reference sources 191 and 192 located at opposing axial ends of the scintillator 180. In embodiments in which the use of a reference source is undesirable, photomultiplier again may be regulated using the shape of the spectrum detected at each of the photomultipliers. For example, the photomultiplier gain may be regulated such that the high energy end of the spectrum is referenced to a fixed energy level. Alternatively, a particular feature of the spectrum may be reference to a fixed energy level.

Those of skill in the art will still further appreciate that a distinction between detected neutrons and gamma rays may be made based upon the pulse shape received at the pulse height analyzers 188 and 189. The total energy deposited into the scintillator may be reconstructed using the amplitudes $A_1$ and $A_2$ and the corresponding position information. The position information is generally needed to account for the quantity of light lost in the scintillator.

In an alternative embodiment, a time difference between the scintillation signals arriving at the first photomultiplier and the second photomultiplier may be used to determine the axial position of the scintillation event. Such an embodiment would generally require the use of circuitry capable of providing sub-nanosecond timing as light generally travels at about <20 centimeters per nanosecond in a typical scintillation material.

Figure 7:
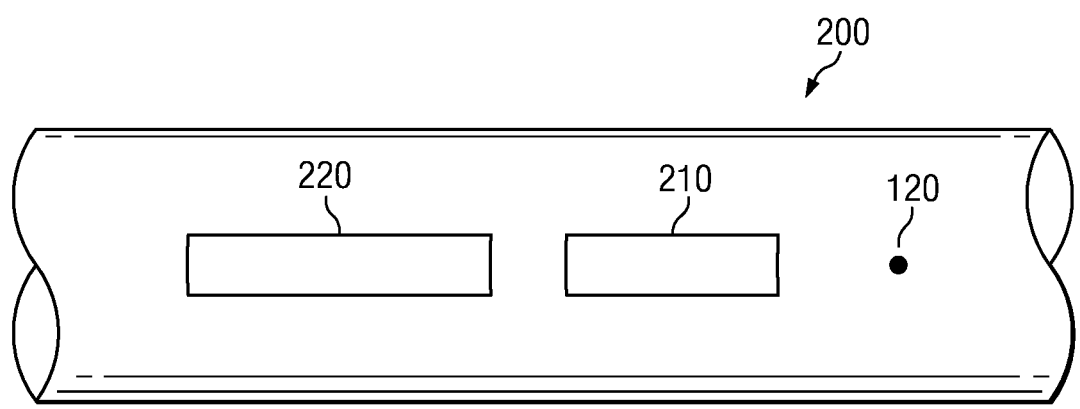
FIG. 7 depicts an alternative embodiment of a neutron logging tool in accordance with the present invention.

It will be understood that the invention is not limited to tool embodiments including a single neutron detector. FIG. 7 depicts a neutron logging tool embodiment 200 in accordance with the present invention having neutron source 120 and first and second, near and far neutron detectors 210 and 220. At least one of the neutron detectors 210 and 220 is a position sensitive neutron detector as described above with respect to FIGS. 3-6. For example, in one embodiment both the near and far detectors may include a position sensitive neutron detector. The use of far and near detectors tends to provide better neutron count sensitivity, particularly in formations in which the neutron flux near the source tends to dominate the count rate.

Those of ordinary skill in the art will readily appreciate that the invention is not limited to embodiments in which one or more position sensitive neutron detectors are deployed at a single azimuthal (circumferential) position on the tool body as depicted on FIGS. 3 and 7. Additional detectors may likewise be deployed at other azimuthal positions (e.g., on the opposite side of the tool body).

Figure 8:
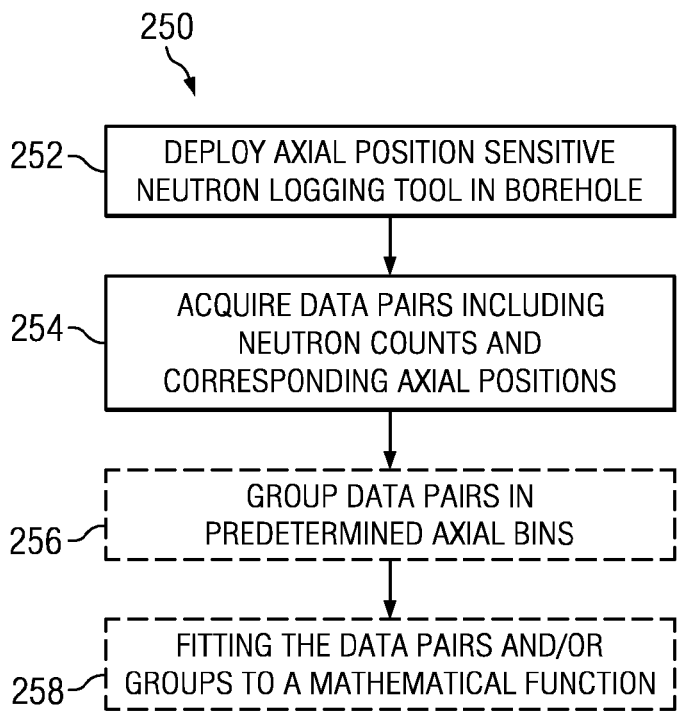
FIG. 8 depicts a flow chart of one exemplary method embodiment in accordance with the present invention.

FIG. 8 depicts a flow chart of one exemplary method embodiment 250 in accordance with the present invention. A neutron logging tool in accordance with the present invention (e.g., logging tool 100 depicted on FIG. 3) is deployed in a subterranean borehole at 252. A plurality of data pairs is detected using the position sensitive neutron detector at 254. Each data pair includes a neutron count (a detected neutron) and a corresponding axial location. These data pairs may then be stored in downhole memory or transmitted uphole, for example, via conventional telemetry techniques or via a hard wire connection. To reduce the data volume (e.g., in logging while drilling applications) it may be advantageous to axially distribute the data pairs. In one exemplary embodiment of the invention, the detected neutrons may optionally be grouped at 256 in predetermined axial bins (e.g., at one inch increments along the length of the detector). The neutron counts in these bins may further be weighted, for example, via conventional windowing or other mathematical filtering techniques. At 258 the data pairs and/or the groups obtained in 256 may further be fitted to a mathematical function.

Figure 9:
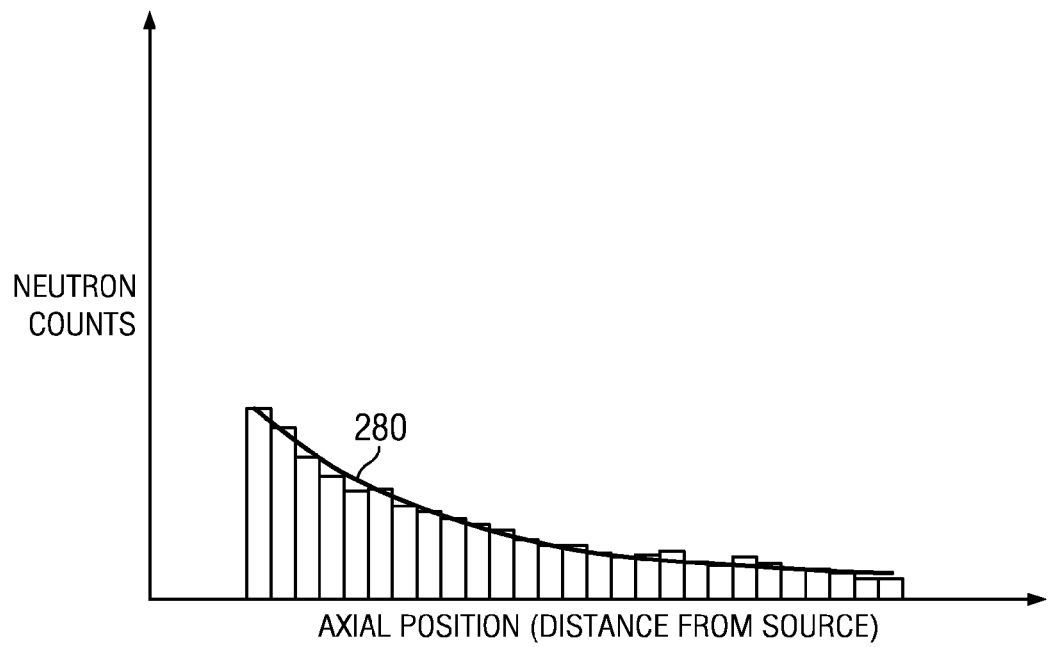
FIG. 9 depicts a hypothetical plot of neutron counts on the vertical axis versus axial distance from a neutron source on the horizontal axis for the exemplary tool embodiment depicted on FIG. 3.

FIG. 9 depicts a hypothetical plot of neutron counts on the vertical axis versus axial position on the horizontal axis. In the exemplary embodiment depicted, the data pairs (neutron counts and corresponding axial positions) have been grouped into 27 axial bins, each of which corresponds to a predetermined range of axial positions. In prior art neutron logging techniques the near to far detector ratio is commonly used as an indicator of one or more formation properties (e.g., porosity). The plot depicted on FIG. 8 enables a large number of ratios to be computed, for example the ratio of bin 1 to bin 2, bin 1 to bin 3, bin 2 to bin 3, bin 1 to bin 4, or bins 2-6 to bins 12-16, bins 9-12 to bins 22-24 and so on. Embodiments including eight or more bins tend to be advantageous in that they provide a large number of ratios. Optimal ratios can be selected depending on the logging environment and logging speed as well as based on the expected or initially measured formation porosity. For example, a ratio of bins 8-12 to bins 20-24 may be used to compute an initial formation porosity. If the initial porosity is low (e.g., less than 20 porosity units), a ratio that corresponds to longer spacings to the source may be selected, such as a ratio of bins 12-16 to bins 23-27. The formation porosity may then be recomputed with improved accuracy due to the longer spacings. If the initial porosity is high and the statistical precision relatively poor (due to low count rates), a ratio with shorter spacings to the source may be selected, such as a ration of bins 4-8 to bins 16-20. The formation porosity may then be recomputed with smaller statistical error.

Moreover, the neutron counts in the aforementioned groups may be further fit to an empirical or theoretical mathematical function as depicted at 280. Both the evaluation of multiple ratios and the fitting of the neutron count data to a mathematical function advantageously provide additional information for evaluating the formation that should be particularly useful for detecting bed boundaries and thin bed evaluation. Moreover, improved statistics of the neutron logging measurement may be achieved as counts are acquired for a large number of spacings.

It will be understood that a position sensitive neutron logging tool in accordance with the present invention may also be configured to measure the neutron slowing down time. The slowing down time is generally considered to be the time it takes an emitted fast neutron (typically a 14-MeV neutron generated in a pulsed neutron generator) to slow down to thermal energy (0.025 eV at room temperature). The slowing down of the neutrons tends to be an excellent indicator of the presence of hydrogen in the formation. Slowing down time may be measured, for example, by determining the decay constant of the epithermal neutron population using an epithermal neutron detector. This can be accomplished if the timing of the neutron emission is known and therefore generally requires the use of a pulsed neutron generator that can deliver predictable bursts of neutrons.

Figure 10:
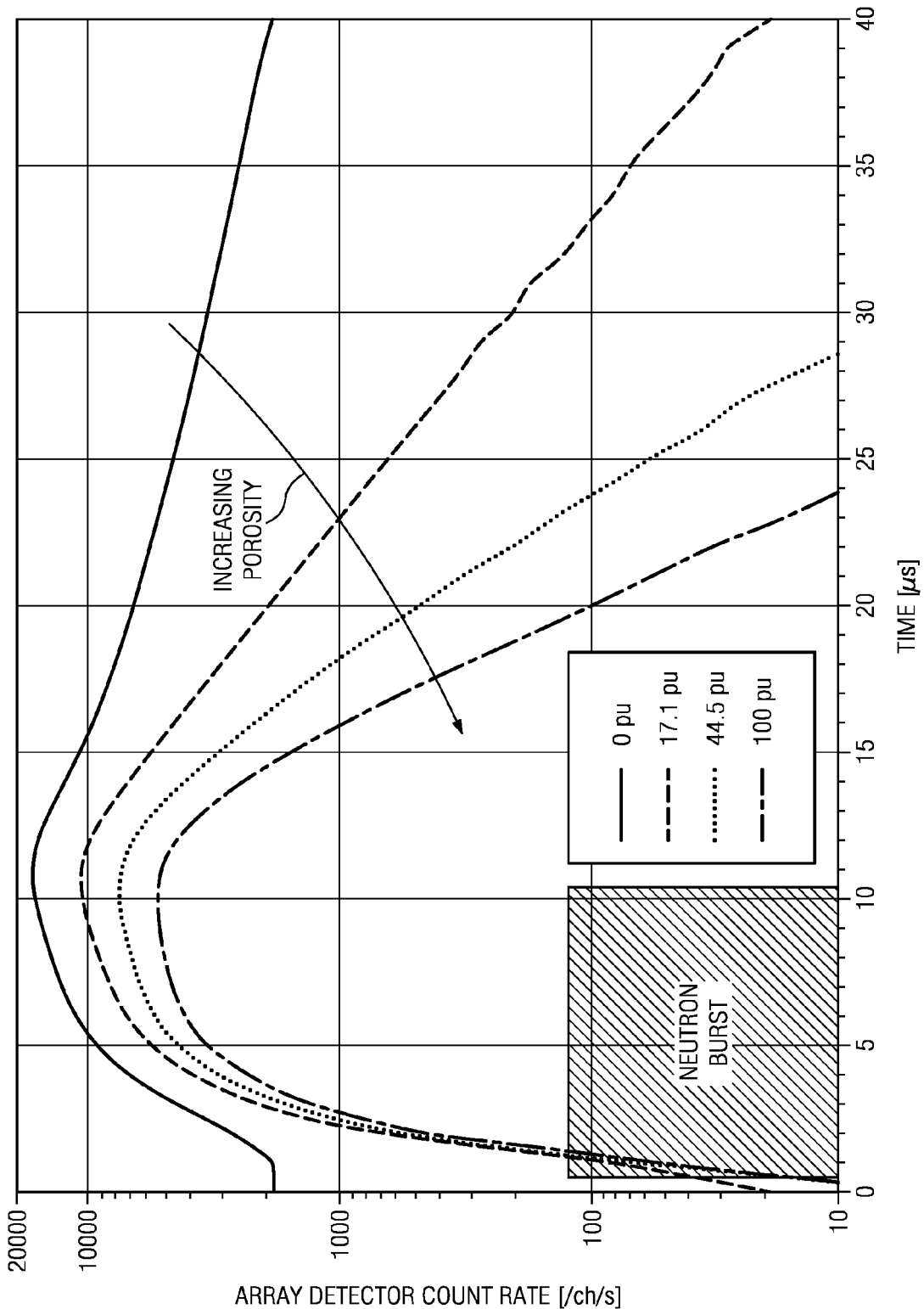
FIG. 10 depicts an epithermal neutron count rate as a function of time and porosity in fluid filled limestone.

FIG. 10 depicts a plot of neutron detector count rate (on the y-axis) versus time (on the x-axis) measured with a $^3$He-epithermal detector at different formation porosities. During the neutron burst, there is a build up of the epithermal neutron population. After the burst the population rapidly decays due to neutron scattering. The neutron decay may be approximated by an exponential function thereby enabling a corresponding decay time to be determined. As indicated, the decay time (or slowing down time) tends to decrease with increasing porosity.

In determining the slowing down time, it is typically advantageous to use an epithermal detector so that there is no need to subtract background thermal neutrons. When using a $^3$He proportional counter, thermal neutrons may be advantageously suppressed, for example, by surrounding the detector with a thermal neutron absorber (e.g., a 0.5 to 1.5 mm thick Cadmium foil). When using a scintillation detector (e.g., a scintillation crystal), which may also be sensitive to gamma rays, it is preferable to use a thermal neutron absorber that does not emit gamma-rays as a consequence of the neutron absorption. In such embodiments, $^6$Li tends to be a suitable shielding material.

It will be understood that position sensitive neutron logging tools in accordance with the present invention may also be configured to measure the macroscopic thermal neutron capture cross section (also referred to in the art as sigma), for example as disclosed in U.S. Pat. No. 7,365,307. This allows the measurement of sigma as a function of vertical position. If using a scintillation detector configured to measure neutrons and gamma-rays and to distinguish between the two interactions, sigma can be determined from both the decay time of the gamma-ray and the neutron counts. This in turn can be used to get insight at multiple depths of investigation.

As described above, the use of a position sensitive neutron detector enables a significant increase in the quantity of information that can be acquired in neutron logging operations as compared to prior art neutron logging measurement techniques. In the prior art, as described above, neutron count rates are measured at near and far detectors, the ratio of which is used to derive a formation porosity. The possibility of using a position sensitive neutron detector to replace a set of near and far detectors has been previously disclosed by Gadeken in U.S. Pat. No. 4,570,067. Gadeken discloses the use of a position sensitive detector to obtain a thermal and an epithermal porosity (referred to as dual porosity) and the directly related quantities of neutron slowing down length $L_s$ and neutron migration length $L_m$. While the approach of using a position sensitive detector differs from the conventional approach of using two pairs of detectors (one thermal and one epithermal), the Gadeken measurement follows the traditional approach of using a single near to far count rate ratio (a single ratio for thermal neutrons and a single ratio for epithermal neutrons).

The present invention makes use of the position sensitive detector(s) to acquire additional information, which provides information of additional formation and borehole properties, to provide environmental corrections, to determine standoff and mud properties, and in the case of a rotating tool or a tool with sensors at multiple azimuthal positions, to obtain formation images and/or a borehole caliper. In particular, exemplary method embodiments in accordance with the present invention measure an axial neutron flux distribution (i.e., a position dependent count rate) N(z) (where z denotes the distance between the location of the neutron reaction in the detector with respect to the center of the neutron source and N denotes the number of counts at a given distance with respect to the source).

In one exemplary embodiment of the invention, N(z) may be used to obtain multiple neutron count rate ratios, for example, as described above with respect to FIG. 9. Various factors may be taken into account in determining a preferred ratio or ratios for estimating formation porosity (as also described above). In alternative embodiments of the invention, N(z) may be advantageously fit to a function $f$, which depends not only on formation porosity (or a slowing down length) but on at least a second parameter. The second parameter may include, for example, the standoff distance between the sensor and the borehole wall such that: $N(z)=f(\phi, s)$, where $\phi$ denotes the formation porosity and s the sensor standoff. Evaluation of the function $f$ may therefore advantageously enable an estimation of both the formation porosity and the sensor standoff. Moreover, it will be understood that the evaluation of $f$ may further obviate the need for making independent standoff measurements during neutron logging operations in that a sufficient quantity of information will be available to compute both the formation porosity and sensor standoff.

It will be understood that additional information, such as the epithermal neutron slowing down time (either as an average value over all the distances z or as a position sensitive value SDT(z)), may also be utilized in obtaining the aforementioned fit to N(z). The use of a slowing downtime may be advantageous in that it is particularly sensitive to sensor standoff.

In LWD embodiments in which the neutron logging tool is rotating the sensor standoff tends to be highly variable as a function of azimuth (tool face). Determination of the axial neutron flux distribution N(z) (with or without a slowing down time measurement) enables compensation of the neutron porosity measurement with changing standoff (e.g., as a function of azimuth). Furthermore, N(z) may be used to correct previously obtained standoff measurements, or even to compute standoff values as a function of azimuth. The computed standoff measurements may then be utilized to construct a caliper image of the borehole size and shape.

Evaluation of the function N(z) may further enable the position of bed boundaries to be located. Such boundaries may result sharp slope changes (or other anomalies) at a particular axial location z in N(z).

It is well known that in air-filled boreholes (as opposed to fluid filled borehole) the traditional ratio to porosity transform fails to yield accurate porosity values. The near to far ratio in an air filled borehole may be bi-valued, i.e. a single ratio may correspond to two very different porosity values and at intermediate porosity values the ratio may be insensitive to porosity changes. Determination of the function N(z) may enable this problem to be overcome in that a change in the slope or in the shape of N(z) as a function of z makes it possible to determine a neutron porosity even in this difficult operational situation.

It will be understood that method embodiments in accordance with the present invention may be implemented either uphole (e.g., by an operator at the surface or on a surface computer) or downhole (e.g., by a downhole controller). The invention is in no way limited in these regards. Moreover, it will be further understood that the aspects and features of the present invention may be embodied as logic that may be processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Alternatively the processing system may be at the surface and configured to process data sent to the surface by sensor sets via telemetry or data link systems known in the art. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

We claim:

1. A neutron logging tool comprising:
    a downhole logging tool body;
    a neutron source;
    a position sensitive neutron detector, an axis of which is substantially parallel with an axis of the tool body; and
    a controller configured to determine axial locations of neutrons detected by the position sensitive neutron detector, determine an axial neutron flux distribution based upon the axial locations of the detected neutrons, and to distribute the axial neutron flux distribution into a plurality of predetermined axial bins, each of the bins including neutron counts at a range of corresponding axial positions.

2. The logging tool of claim 1, wherein the neutron source comprises an americium-241/beryllium chemical source, a californium-252 chemical source, or an electrical neutron source that utilizes the deuterium-tritium nuclear reaction, the deuterium-deuterium nuclear reaction, or the tritium-tritium nuclear reaction.

3. The logging tool of claim 1, wherein the position sensitive neutron detector comprises a gas counter with a highly resistive anode wire material.

4. The logging tool of claim 3, wherein the position sensitive neutron detector comprises at least one boron-coated gas proportional counter.

5. The logging tool of claim 3, wherein the position sensitive neutron detector is a 3-He proportional counter.

6. The logging tool of claim 3, wherein the position sensitive neutron detector comprises a bundle of boron-coated straws, each of which has an axis parallel to a longitudinal axis of the tool body.

7. The logging tool of claim 6, wherein the controller is further configured to determine which of the boron-coated straws detects the neutron, the boron-coated straw being indicative of a circumferential position of the detected neutron.

8. The logging tool of claim 1, wherein the position sensitive neutron detector comprises: a scintillation crystal having an axis substantially parallel with the axis of the tool body; and first and second photomultipliers deployed at corresponding first and second ends of the scintillation tube.

9. The logging tool of claim 8, wherein each of the photomultipliers is connected to a corresponding pulse height analyzer configured to determine amplitudes of received optical energy.

10. The logging tool of claim 9, wherein the controller is configured to determine the axial location of the detected neutron from the amplitudes of the received optical energy at each of the photomultipliers.

11. The logging tool of claim 1, comprising first and second, near and far position sensitive neutron detectors.

12. A method for making a neutron logging measurement in a subterranean borehole, the method comprising:
 (a) deploying a neutron logging tool in a borehole, the neutron logging tool including a neutron source and a position sensitive neutron detector configured to determine an axial position of detected neutrons;
 (b) using the neutron detector to measure an axial neutron flux distribution; and
 (c) distributing the axial neutron flux distribution into a plurality of predetermined axial bins, each of the bins including neutron counts at a range of corresponding axial positions.

13. The method of claim 12 comprising at least eight distinct axial bins.

14. The method of claim 12, further comprising: (d) computing a plurality of ratios between the neutron counts in certain ones of the axial bins; and (e) computing a formation porosity using the plurality of ratios.

15. The method of claim 12, further comprising (d) computing a first ratio of neutron counts between at least first and second axial bins; (e) computing a first formation porosity using the first ratio; (f) computing a second ratio of neutrons between at least third and fourth axial bins, the third and fourth axial bins being selected based upon the formation porosity computed in (e); (g) computing a second formation porosity using the second ratio.

16. The method of claim 12, further comprising: (c2) fitting the axial neutron flux distribution to a mathematical function.

17. The method of claim 16, wherein the mathematical function relates a neutron count rate to an axial distance from a neutron source.

18. The method of claim 16, further comprising: (d) evaluating the mathematical function to estimate a subterranean formation parameter.

19. The method of claim 16, wherein the mathematical function relates the axial neutron flux distribution to formation porosity and at least one other parameter.

20. The method of claim 16, wherein the mathematical function relates the axial neutron flux distribution to formation porosity and sensor standoff.

21. The method of claim 20, further comprising: (d) evaluating the mathematical function to obtain formation porosity and sensor standoff.

22. The method of claim 21, wherein (d) further comprises evaluating an epithermal neutron slowing down time to obtain formation porosity and sensor standoff.

23. The method of claim 21, further comprising: (e) evaluating the sensor standoff and an azimuth angle to obtain a borehole caliper.

24. The method of claim 12, further comprising: (c) evaluating the axial neutron flux distribution to locate a bed boundary.

25. The method of claim 12, further comprising: (c) measuring at least one of a neutron slowing down time and a macroscopic thermal neutron capture cross section.

* * * * *